May 13, 1952     F. W. SAMPSON     2,596,440
TURNING SIGNAL DEVICE FOR AUTOMOTIVE VEHICLES
Filed April 13, 1949     2 SHEETS—SHEET 1
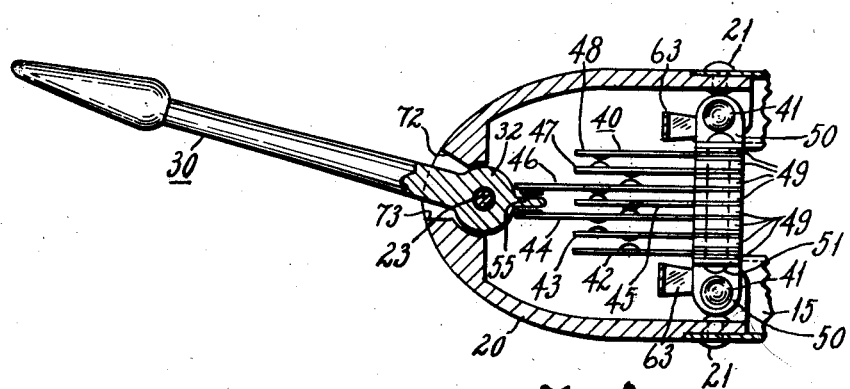
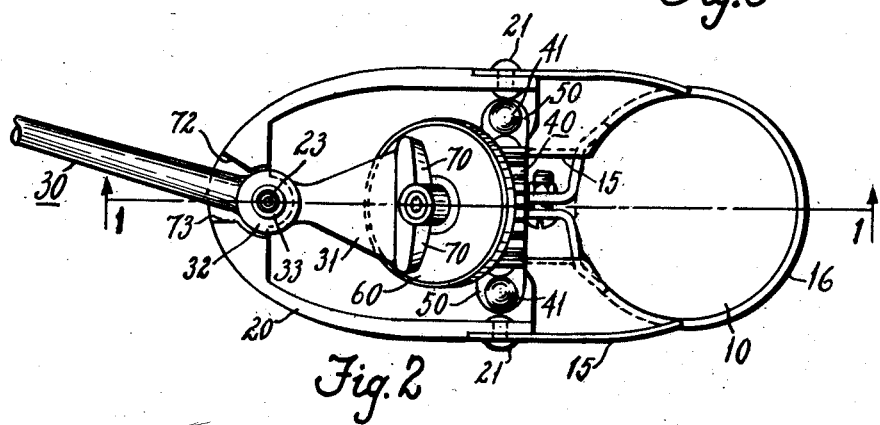
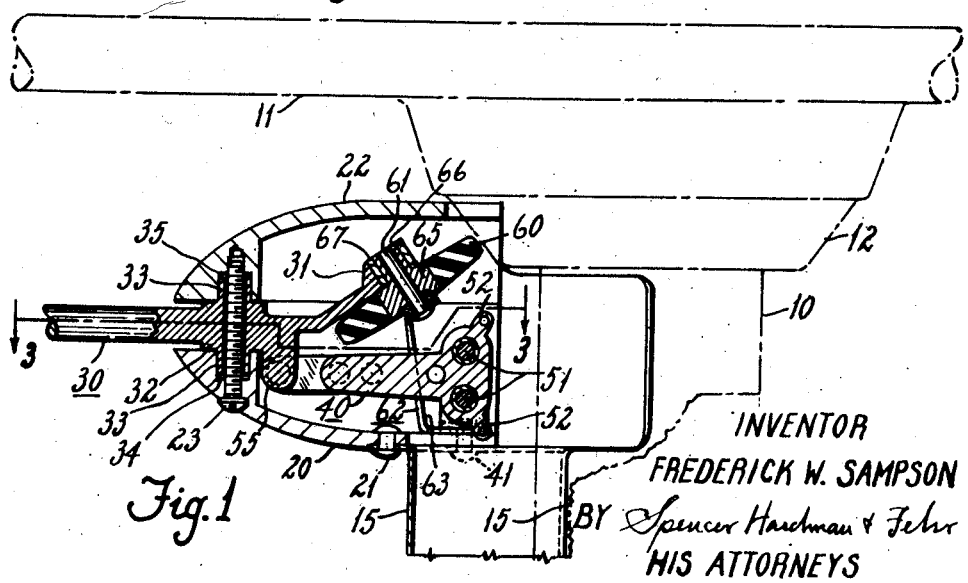
INVENTOR
FREDERICK W. SAMPSON
BY Spencer Hardman & Fehr
HIS ATTORNEYS May 13, 1952  F. W. SAMPSON  2,596,440
TURNING SIGNAL DEVICE FOR AUTOMOTIVE VEHICLES
Filed April 13, 1949  2 SHEETS—SHEET 2
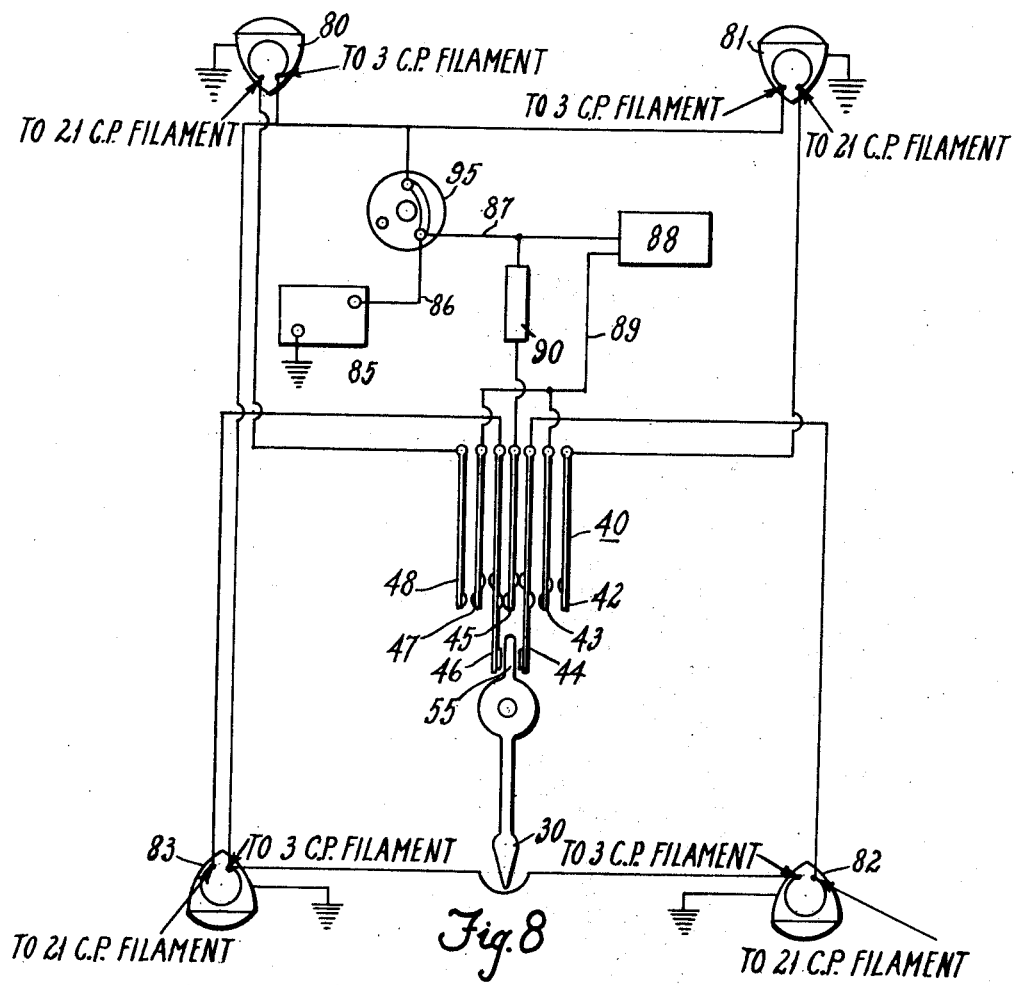
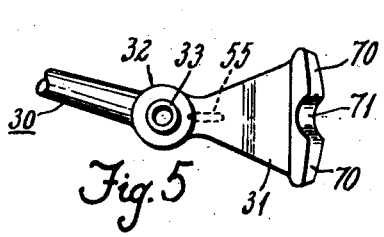
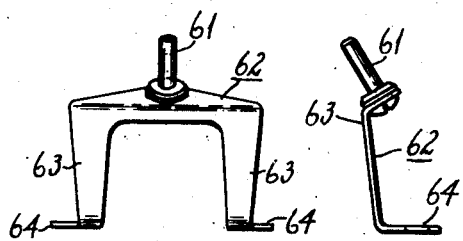
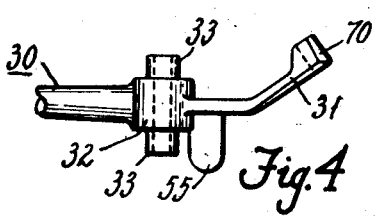
INVENTOR
FREDERICK W. SAMPSON
BY Spencer Hardman & Fehr
HIS ATTORNEYS Patented May 13, 1952

2,596,440

UNITED STATES PATENT OFFICE 2,596,440

TURNING SIGNAL DEVICE FOR AUTOMOTIVE VEHICLES

Frederick W. Sampson, Dayton, Ohio, assignor to General Motors Corporation, Detroit, Mich., a corporation of Delaware Application April 13, 1949, Serial No. 87,182

5 Claims. (Cl. 200—59)

This invention relates to turning signal switches for automotive vehicles and the like.

An object of this invention is to provide an improved and efficient turning signal device having a manually operated member for controlling turning signals such as lights on the front and rear ends of the vehicle, and having means for returning said manual member to its neutral "off" position actuated by the return movement of the steering wheel to its normal driving position.

Important novel features of the device of this invention include the following:

A relatively short swing of the operating lever to close a switch and give the signal for the proposed turn also moves a friction roller into driving contact with the steering wheel hub. Thereupon turning the steering wheel to make the proposed turn drives said friction roller and thereby further swings said lever in the same direction in which said lever was initially moved. Further turning of the steering wheel in the same direction after said lever reaches the end of its predetermined full swing causes the friction roller to merely idle on its bearing while maintaining driving contact with said hub. Such idling of the friction roller prevents sliding and consequent wear between the friction roller and said hub.

Upon the reverse turning of the steering wheel to straighten up the vehicle, the friction roller is immediately driven in its reverse direction by said hub which in turn starts to swing said lever toward its neutral "off" position. However said lever reaches its "off" position only after the steering wheel has been turned thru a predetermined angle in straightening up the vehicle, for example about 60 degrees. This predetermined angle is the "turn-off lag" of the signal after the steering wheel starts its return movement. With this device the "turn-off lag" is constant after any turn which causes the steering wheel to be rotated as much or more than thru said predetermined angle. This constant "turn-off lag" is important because it prevents undesired turning off of the signal too quickly, for instance when the steering wheel is incidentally reversed thru a relatively small angle during the progress of making the turn.

The device of this invention can be readily installed upon the mast jacket or other stationary support and used with any design of steering wheel having a rotating lower hub portion without removing the steering wheel from its shaft or otherwise disassembling the steering wheel. The device can be readily mounted upon the stationary mast jacket of the vehicle, as by suitable clamps, so that the friction roller will operatively contact and be driven by some portion of the rotating hub of the steering wheel without requiring any particular design for said hub. Of course, if so desired, the friction roller can also be arranged to similarly contact and be driven by any rotatable member which rotates only when the steering wheel rotates and also reverses its direction of rotation with the steering wheel.

The signal switch of this invention is very simple and efficient, wear is minimized thruout and there are no sliding cams to cause substantial wear. The idler bushing on the projecting hub of the friction roller rolls rather than slides upon the cam on the inner end of the operating lever.

Further objects and advantages of the present invention will be apparent from the following description reference being had to the accompanying drawings wherein a preferred embodiment of the present invention is clearly shown.

In the drawings:

Fig. 1 illustrates the device of this invention, shown in section, when mounted upon the mast jacket of an automobile. The partially broken away steering wheel and its mast jacket are shown in outline by dash-dot lines. The section thru the device is taken on line 1—1 of Fig. 2.

Fig. 2 is a top view of the device with its housing cap removed. The outer end of the operating lever is shown broken away in Figs. 1 and 2.

Fig. 3 is a section thru the device taken on the staggered line 3—3 of Fig. 1.

Figs. 1, 2 and 3 show all the parts in position when the operating lever is in neutral "off" position.

Figs. 4 and 5 are detail views of the one piece operating lever. Fig. 4 is a side view and Fig. 5 a top view thereof.

Figs. 6 and 7 are detail views of the spring support for the friction wheel. Fig. 6 is a face view and Fig. 7 is a side view thereof.

Fig. 8 shows a wiring arrangement for this signal switch wherein the same 21 candle power rear lights are utilized both as foot-brake operated stop lights and as flashing signal rear lights to indicate turns. The flashing signal front lights to indicate turns are added for the purpose. All four signal lamps are shown as also having 3 candle power filaments for use as parking lights. The extra parking light filaments in said lamps at the four corners of the vehicle are turned on or off by a separate switch independent of the turning signal switch.

Similar reference characters refer to similar parts thruout the drawings.

Numeral 10 designates the customary stationary mast jacket which surrounds and houses the steering shaft upon which the steering wheel 11 is fixed. For clarity of illustration Fig. 1 shows all the parts with the mast jacket 10 in vertical position rather than in its usual inclined position, however the relative positions of all the parts will be as shown whether the mast jacket 10 and its enclosed steering shaft be vertical or inclined at any desired angle. Steering wheel 11 has a rounded lower hub portion 12 which of course rotates relative to the stationary mast jacket 10 when steering the vehicle. The signal switch is suitably mounted upon the stationary jacket 10 in close proximity to the hub portion 12.

In the form shown, a stamped metal attachment base 15 is fixed to the outside of jacket 10 by any suitable means such as by clamping rings 16. A die-cast metal housing 20 is fixed to attachment base 15 by means of rivets 21 whereby housing 20 is held in fixed position. Housing 20 has a readily removable housing cap 22 held clamped thereupon by screw 23. The signal operating lever 30 and its cam segment 31 are integral and shaped as best shown in detail Figs. 4 and 5. Lever 30 has a hub portion 32 and two bearing journals 33 which are rotatably received respectively in lower recess 34 in housing 20 and upper recess 35 in cap 22, all centered upon screw 23 as clearly shown in Fig. 1. The vertical clamping pressure of screw 23 is taken by the lower edge of cap pressing directly upon housing 20 and not upon hub portion 32, thus permitting easy rotation of lever 30 and its cam segment 31 about the journals 33.

An electric switch 40 having a plurality of spring contact leaves is mounted within housing 20 by means of rivets 41. Each contact leaf 42, 43, 44, 45, 46, 47 and 48 is individually insulated by nonconducting fiber portions 49 on opposite sides thereof and all the contact leaves and insulating fiber portions are clamped together and rigidly fixed to the two metal end brackets 50 by the two insulated through rivets 51. Each contact leaf has an individual projecting terminal 52 to which an electric wire is connected. These terminals 52 preferably project alternately upwardly and downwardly on alternate contact leaves, as shown in Fig. 1, in order to facilitate securing the electric wires thereto. The two long contact leaves 44 and 46 extend close to and on opposite sides of a depending lug 55 on the operating lever 30. When lever 30 is swung upwardly (as seen in Fig. 3) lug 55 will engage and flex contact lever 44 downwardly and thereby open contact between leaves 44 and 45 but cause leaves 44, 43 and 42 to mutually contact. When lever 30 is swung downwardly (as seen in Fig. 3) lug 55 will open contact between leaves 46 and 45 but cause leaves 46, 47 and 48 to mutually contact. When lever 30 is in its normal neutral position (shown in Fig. 3) the two long leaves 44 and 46 remain in normal contact with central leaf 45, but there is no other electric contact between the leaves. The signal effects caused by operating these electric contacts are described hereinbelow.

The friction roller 60 is rotatably mounted upon bearing pin 61, which in turn is fixed upon and supported by the inverted U-shaped spring mount 62 as shown in detail Figs. 6 and 7. The two spring legs 63 of mount 62 straddle the electric switch 40, and their turned over bottom ends 64 are rigidly fixed to housing 20 by the same two rivets 41 which fix switch 40 to said housing 20. The peripheral portion of roller 60 is preferably of a yielding friction material, such as flexible rubber or the like. Roller 60 has a metal hub 65 and an integral projecting journal 66 rotatable upon pin 61. A roller bushing 67 fits upon journal 66 of hub 65. The cam segment 31 of lever 30 has a conical cam surface 70 upon which roller bushing 67 is arranged to roll easily whenever said cam segment 31 is swung out of its neutral position. Cam segment 31 has a camming recess 71 within which roller bushing 67 rests under the urging of the spring legs 63 whenever cam segment 31 is in its neutral position, as illustrated in Fig. 1. The parts are arranged so that when roller bushing 67 lies within camming recess 71 the periphery of friction roller 60 is spaced slightly out of driving contact with the hub portion 12 of steering wheel 11, and when roller bushing 67 is cammed out of recess 71 into rolling contact with surface 70 on either side thereof friction roller 60 will be moved against the urge of spring legs 63 into driving contact with said hub portion 12 of the steering wheel.

In operation, when hand lever 30 is swung out of its neutral position (shown in Figs. 1 and 3) to move its lug 55 and make the proper electric contacts to signal, say a left turn, friction roller 60 will be forced into driving contact with hub portion 12 of the steering wheel by flexing spring legs 63. Then when the steering wheel is later turned to make the signalled left turn, friction roller 60 will be rotated and thereby cause bushing 67 to roll upon segment surface 70 in such direction and with such force as to further swing segment 31 in the same direction it was originally swung by hand lever 30 to signal said left turn. Suitable stops 72 and 73 for hand lever 30 are provided to limit the swing of segment 31 to the predetermined angle which will give the desired "turn-off lag" of the signal upon the reverse turning of the steering wheel in straightening up the vehicle. As soon as segment 31 reaches its full swing, due to stops 72 or 73, friction roller 60 may be further rotated in the same direction by the steering wheel without relative sliding therebetween because the friction roller journal 66 can turn idly within roller bushing 67. This also eliminates sliding of bushing 67 on cam surfaces 70.

Now when the steering wheel rotation is reversed to straighten up the vehicle, friction roller 60 through its journal 66 and roller bushing 67 will immediately begin to roll segment 31 back toward its neutral "off" position, but the signal will not be turned off until segment 31 has been rotated thru the predetermined angle provided by stops 72 or 73 back to its central position where roller bushing 67 drops into cam recess 71 due to the urge of spring legs 63. This provides the desired "turn-off lag" of the signal.

For signalling a right turn the device operates similarly, though of course all directions are reversed from those described above for a left turn.

Now referring to the diagrammatic showing in Fig. 8, the two front turning signal lamps 80 and 81 and the two rear turning signal lamps 82 and 83 may be wired up to the signal switch 40 as shown. When hand lever 30 is swung to the left (as viewed in Fig. 8) lug 55 on said lever will engage and move the long spring contact leaf 44 to the right and mutually electrically connect contact leaves 44, 43 and 42. Current from storage battery 85 will then flow via wires 86 and 87, through the flasher unit 88, thence thru wire 89 to contact leaf 43 in contact with leaves 44 and 42, thence to the 21 candle power signal filaments in lamps 81 and 82 on the right side of the vehicle, and thence to ground. The flasher unit 88 alternately opens and closes the circuit therethru periodically by well known means to cause the tuning signal lights to flash intermittently in a well known manner to give the desired turning signal. When the vehicle is straightened up after making the turn, lever 30 and its lug 55 return to their normal positions as described hereinabove, which permits contact leaves 42, 43, and 44 to spring back to their normal positions shown in Fig. 8.

When hand lever 30 is swung to the right (as viewed in Fig. 8) lug 55 will move the long spring contact leaf 46 to the left and mutually electrically connect contact levers 46, 47 and 48. Current will then flow from battery 85 thru flasher unit 88 and wire 89, as before, to contact leaf 47 now in contact with leaves 46 and 48, thence to the 21 candle power signal filaments in lamps 80 and 83 on the left side of the vehicle, and thence to ground.

The same flasher unit 88 is used to give the desired intermittent flashing turning signals in all four lamps 80, 81, 82 and 83.

In the arrangement shown in Fig. 8, the 21 candle power filaments in the two rear lamps 82 and 83 are also used as the customary stop lights for the vehicle by automatically closing switch 90 when the vehicle brake pedal is depressed. At any time while hand lever 30 is in its normal position (shown in Fig. 8) battery 85 is connected thru any suitable stop light switch 90 to the central contact leaf 45 which is normally in contact with contact leaves 44 and 46, which in turn are connected to the bright filaments in lamps 82 and 83 respectively. Hence at any time while no tuning signal is being given the closing of switch 90 will light up the bright filaments in both the rear lamps 82 and 83. Thus these same 21 candle power filaments serve both as ordinary stop lights and as flashing turning signals.

In addition to the bright signal filaments in lamps 80, 81, 82, and 83 each of these four lamps may have a separate low candle power filament suitable for parking lights. In Fig. 8 the dual filament light bulbs each has a separate 21 candle power filament and a 3 candle power filament. These 3 c. p. parking light filaments are switched on and off at any time by means of a separate light switch 95 which controls the current to all four parking lights without in any way interfering with the signal light circuits described above.

Of course, if desired, the turning signal lamps used on the vehicle may be used for turning signals only, that is, separate from the stop lights or any other lights. In such a case the turning signal switch need have only two spring contact leaves for making and breaking only two electric circuits, namely, one circuit for both the front and rear turning lights on the right side of the vehicle, and another circuit for the front and rear turning lights on the left side of the vehicle.

While the embodiment of the present invention as herein disclosed, constitutes a preferred form, it is to be understood that other forms might be adopted.

What is claimed is as follows:

1. In a direction signal switch mechanism for disposition in an automotive vehicle adjacent the steering wheel hub, a two-way electric signal switch, a manual reversely swinging hand lever for actuating said switch to signal a turn in either direction, a friction wheel yieldably mounted adjacent said steering wheel hub and capable of being biassed into driving contact therewith, said wheel having an axially aligned projecting hub portion serving as a cam roller, said hand lever having a cam segment rigid therewith and arranged to press upon said cam roller hub portion and thereby bias said friction wheel into driving contact with said steering wheel hub when said hand lever actuates said switch in either direction to signal a turn in either direction, the pressure between said cam roller hub portion and said cam segment being such as to cause said cam roller hub portion to frictionally drive said cam segment and swing same together with said hand lever to a predetermined switch-closing limit of swing when the steering wheel is rotated to make the signaled turn, and to swing said cam segment and hand lever in a reverse direction to its switch-open position when the steering wheel is rotated in the reverse direction sufficiently to straighten the vehicle.

2. In a direction signal switch for disposition in an automotive vehicle adjacent a reversely rotatable steering member, a friction wheel reversely rotatable by said steering member and having a laterally projecting axially aligned hub portion serving as a cam roller, a reversely swinging manual switch arm for actuating the signal switch, a segmental cam manually swingable with said switch arm into driving frictional engagement with said cam roller by the switch-closing movement of said switch arm to swing said cam together with said switch arm to a neutral switch-off position when said friction wheel rotates in a predetermined direction.

3. In a direction signal switch for disposition in an automotive vehicle adjacent a reversely rotatable steering member for controlling two electric circuits, a manual arm for operating said switch for selectively establishing one of said two circuits when said arm is moved from its neutral switch-off position to the selected switch-on position, a friction wheel mounted so as to be resiliently movable into and out of driving engagement with said steering member, said wheel having an axially aligned hub portion serving as a cam roller, said manual arm having a segmental cam swingable therewith to press against said cam roller hub portion and force said wheel into driving engagement with said steering member when said manual arm is swung to a switch-on position in either direction from its neutral switch-off position, said cam roller hub portion upon rotation thereof in a predetermined direction serving to frictionally drive said segmental cam and thereby swing said manual arm to its neutral switch-off position.

4. In a direction signal switch for disposition in an automotive vehicle adjacent a reversely rotatable steering member, a friction wheel reversely rotatable by said steering member and having an axially aligned hub portion serving as a cam roller, a reversely swinging manual switch arm for actuating the signal switch, a segmental cam swingable with said switch arm into driving frictional engagement with said cam roller hub portion by the switch-closing movement of said switch arm to cause said cam roller to swing said cam together with said switch arm to a neutral switch-off position when said cam roller hub portion rotates in a predetermined direction, and upon rotation thereof reversely to said predetermined direction serving to swing said switch arm to a predetermined limit of swing in switch-on position.

5. In a direction signal switch for disposition in an automotive vehicle adjacent a reversely rotatable steering member, a manual swinging actuating arm for opening and closing the switch, a friction wheel resiliently mounted so as to be movable into and out of driving engagement with said steering member, said wheel having an axially aligned hub portion serving as a cam roller, a curved cam swingable with said actuating arm and arranged to press against said cam roller and thereby force said friction wheel into driving engagement with said steering member when said arm is manually swung to close the switch, the parts being so arranged that the rotation of said cam roller in a predetermined direction will drivingly engage said curved cam and thereby swing said arm to open the switch.

FREDERICK W. SAMPSON.

REFERENCES CITED

The following references are of record in the file of this patent:

UNITED STATES PATENTS

| Number | Name | Date |
| --- | --- | --- |
| 1,468,830 | Ouzoonian | Sept. 25, 1923 |
| 1,647,663 | Pollock | Nov. 1, 1927 |
| 1,690,370 | Hoeller | Nov. 6, 1928 |
| 1,713,305 | Stonehill | May 14, 1929 |
| 1,857,935 | Blum et al. | May 10, 1932 |
| 1,996,416 | Haines | Apr. 2, 1935 |
| 2,144,595 | Condon | Jan. 17, 1939 |
| 2,206,199 | Murray | July 2, 1940 |
| 2,308,108 | Roedding | Jan. 12, 1943 |